(12) United States Patent
Ueda et al.

(10) Patent No.: US 7,007,510 B2
(45) Date of Patent: Mar. 7, 2006

(54) METHOD OF PRODUCING AN OPTICAL MEMBER

(75) Inventors: Tetsuji Ueda, Koriyama (JP); Akira Fujinoki, Koriyama (JP); Hiroyuki Nishimura, Koriyama (JP); Martin Trommer, Kahl am Main (DE); Stefan Ochs, Bad Camberg (DE)

(73) Assignees: Heraeus Quarzglas GmbH Co. KG, Hanau (DE); Shin-Etsu Quartz Products Ltd., Tokyo (JP)

( * ) Notice: Subject to any disclaimer, the term of this patent is extended or adjusted under 35 U.S.C. 154(b) by 5 days.

(21) Appl. No.: 10/731,186

(22) Filed: Dec. 9, 2003

(65) Prior Publication Data

US 2004/0112088 A1 Jun. 17, 2004

Related U.S. Application Data

(62) Division of application No. 09/997,222, filed on Nov. 28, 2001, now abandoned.

(30) Foreign Application Priority Data

Nov. 30, 2000 (JP) .............................. 2000-365349
Sep. 3, 2001 (DE) ............................... 101 42 893

(51) Int. Cl.
  *C03C 23/00* (2006.01)
(52) U.S. Cl. .......................................... 65/23; 65/103
(58) Field of Classification Search ................... 65/23, 65/104, 102, 103, 33.1, 117; 156/155
See application file for complete search history.

(56) References Cited

U.S. PATENT DOCUMENTS

| | | | |
|---|---|---|---|
| 4,279,480 A | 7/1981 | Bettiol et al. | |
| 4,679,918 A | 7/1987 | Ace | |
| 5,086,352 A | 2/1992 | Yamagata et al. | |
| 5,236,486 A | 8/1993 | Blankenbecler et al. | |
| 5,601,627 A * | 2/1997 | Mashige | 65/102 |
| 5,720,791 A * | 2/1998 | Miyaura | 65/37 |
| 5,822,134 A | 10/1998 | Yamamoto et al. | |
| 6,578,382 B1 * | 6/2003 | Ueda et al. | 65/30.1 |

FOREIGN PATENT DOCUMENTS

| | | | |
|---|---|---|---|
| EP | 0 401 845 A2 | | 12/1990 |
| JP | 63218522 A | * | 9/1988 |
| JP | 08091857 A | * | 4/1996 |

* cited by examiner

*Primary Examiner*—Dionne A. Walls
*Assistant Examiner*—Lisa L. Herring
(74) *Attorney, Agent, or Firm*—Tiajoloff & Kelly (57) ABSTRACT

An object of the present invention is to provide an improved blank such that an optical member of a high homogeneity can be obtained therefrom, and to provide a vessel and a heat treatment method for heat-treating a highly uniform synthetic quartz blank. In a first aspect of the invention a special designed blank is provided showing a concave shaped outer surface. In a second aspect of the invention a special designed vessel for heat-treating blanks is provided, whereby the degree of heat emission at the center is set higher than that of the surroundings.

23 Claims, 10 Drawing Sheets

(Prior Art)

(Prior Art)

| | Δn before treatment (×10⁻⁶) | Δn after treatment (×10⁻⁶) | Birefringence (nm/cm) | Initial transmittance | Hydrogen concentration (×10¹⁷) | Impurity, Na |
|---|---|---|---|---|---|---|
| Example 1 | 4.9 | 0.6 | 0.33 | 99.8 % | 5.2 | 2 ppb or lower |
| Example 2 | 7.8 | 0.9 | 0.43 | 99.8 % | 5.1 | 2 ppb or lower |
| Example 3 | 5.5 | 0.9 | 0.45 | 99.8 % | 5.2 | 2 ppb or lower |
| Comparative Example 1 | 5.7 | 1.7 | 1.4 | 99.8 % | 5.3 | 2 ppb or lower |
| Comparative Example 2 | 6.2 | 2.5 | 1.5 | 99.8 % | 5.0 | 2 ppb or lower |

METHOD OF PRODUCING AN OPTICAL MEMBER

This application is a divisional of U.S. patent application Ser. No. 09/997,222 filed Nov. 28, 2001, by applicants Tetsuji Ueda et al., now abandoned.

FIELD OF THE INVENTION

The present invention relates to a blank for an optical member of quartz glass which includes a contour of the optical member with an overdimension and has a surface which is defined by a lower side, an upper side opposite the lower side and spaced apart therefrom and by an outer edge extending around a center axis.

Furthermore, the present invention relates to a vessel for heat-treating a cylindrical blank for an optical member of synthetic quartz glass, which includes the contour of said optical member with an overdimension and comprises an interior for receiving said blank and $SiO_2$ powder for filling intermediate spaces, said interior having a removable upper side and a lower side opposite said upper side and spaced apart therefrom, and an outer edge connecting upper side and lower side and extending around a center axis.

Moreover, the invention relates to a method for producing a blank for an optical member of quartz glass, comprising a step of providing said blank which includes the contour of the optical member to be produced with an overdimension and has a surface which is defined by a lower side, an upper side opposite said lower side and spaced apart therefrom and by an outer edge extending around a center axis, and of subjecting said blank to a thermal treatment and subsequently cooling the same.

BACKGROUND

Conventionally, the technology of optical lithography comprising transferring a pattern on a photomask to a wafer by using a laser radiation has been widely used in the aligners for producing semiconductor integrated circuits because of its advantage in process cost as compared with other technologies using electron beam or an X-ray.

Recently, as the LSIs increase their fineness and the degree of integration, light sources having shorter wavelength are being used for the exposure, and there have been practically used an aligner using an i line (having a wavelength of 365 nm) which enables the formation of patterns 0.4 to 0.5 µm in pattern line widths, or a KrF excimer laser (emitting a radiation 248.3 nm in wavelength) which enables patterns 0.25 to 0.35 µm in pattern line widths. More recently, an ArF excimer laser (emitting a radiation 193.4 nm in wavelength), which enables the formation of patterns 0.13 to 0.2 µm in pattern line widths, has been developed, and the study to bring it in practical use is under way. However, the optical members for use in the ArF excimer laser lithographic apparatuses demand that they satisfy, at a never required high level, a further increased uniformity, high transmitting properties, an excellent resistance against laser radiations, etc.

As a material for an optical member satisfying the requirements above, a synthetic quartz glass of high purity is being used, and improvements in the optical transmittance and the resistance against laser radiations of such a material have been made by optimizing the production conditions, and, at the same time, a further improvement in optical characteristics such as uniformity and birefringence is being made. Among them, the improvement in uniformity and the reduction of birefringence can be realized only by applying a heat treatment (annealing treatment) accompanying a gradual cooling in the production process of the optical member to thereby remove the stress of the quartz glass. As such a heat treatment, a method comprising holding the quartz glass inside the heating furnace at a high temperature for a long duration of time has been believed to be a general method.

However, on lowering the temperature during the annealing treatment above, temperature distribution generates between the central portion and the outer peripheral portion of the object being treated. Such a temperature distribution remains as a difference in density even after the completion of the annealing treatment, and this led to an insufficient improvement concerning the distribution in refractive index and the birefringence.

Accordingly, in order to further improve the distribution in refractive index and the birefringence of a quartz glass, there has been proposed a method of applying the annealing treatment to the object while placing it inside a ring, a vessel, or a powder; the aim of which being controlling the temperature distribution by decreasing the rate of lowering the temperature for the outer periphery of the object. This method can surely improve the distribution in refractive index and the birefringence of a quartz glass to a certain degree, but the effect was found still unsatisfactory.

A blank of the generic type and a method of producing the same are known from EP-A 401 845. The production of a lens for a microlithographic device is described therein. To this end a rod-shaped ingot of synthetic quartz glass is cut down into a number of plate-shaped blanks, an optical member being normally obtained from each of the blanks. In comparison with the outer contour of the optical member to be produced, each of the blanks is provided with an overdimension which is removed in the course of the further manufacturing process.

The homogeneity of the quartz glass blank depends on both a uniform chemical composition and a homogeneous distribution of the so-called "fictive temperature" across the blank. The fictive temperature is a parameter which characterizes the specific network structure of the quartz glass. A standard measuring method for determining the fictive temperature on the basis of a measurement of the Raman scattering intensity at a wave number of about 606 $cm^{-1}$ is described in "Ch. Pfleiderer et al.: "The UV-induced 210 nm absorption band in fused silica with different thermal history and stoichiometry"; J. Non-Cryst. Solids 159 (1993) 145–143".

To reduce mechanical stresses within the plate-shaped blank and to achieve a homogeneous distribution of the fictive temperature, the blank is normally annealed with great care. EP-A 401 845 suggests an annealing program in which the blank is subjected to a holding time for 50 hours at a temperature of about 1100° C. and is subsequently cooled in a slow cooling step at a cooling rate of 2°/h to 900° C. and then in a closed furnace to room temperature. During such a temperature treatment local changes in the chemical composition of the blank, in particular in the areas near the surface, may occur because of an outdiffusion of components. In this respect a particularly long annealing time of the blank for setting a distribution of the fictive temperature that is as uniform possible may even have a disadvantageous effect on the homogeneity of the blank.

The surface of the known blank is defined by an even lower side, an even upper side opposite thereto and by an outer cylindrical surface which connects upper side and lower side. The surface surrounds the contour of the member with an overdimension. An increase in the overdimension alone does not constitute a preferred measure for reducing outdiffusion from the area of the contour of the member during annealing, for larger dimensions of the blank require longer annealing times to ensure a uniform distribution of the fictive temperature within the contour of the member. Longer annealing times increase the manufacturing costs, which in turn promotes outdiffusion. Moreover, a large overdimension entails higher manufacturing costs because of larger losses in material.

SUMMARY OF THE INVENTION

It is therefore the object of the present invention to provide a blank from which optical members of a high homogeneity can be made. It is a further object of the invention to provide a vessel for heat treatment and a heat treatment method capable of efficiently heat-treating a synthetic quartz glass for optical use and improved in homogeneity.

As for the blank, this object starting from the above-mentioned blank is achieved according to the invention in that there is provided a surrounding thickened portion which begins in the area of the outer edge and extends towards the center axis and in which the distance between lower side and upper side is larger than in the area of the center axis.

As has already been mentioned, the homogeneity of the quartz glass is substantially determined by the distribution of the fictive temperature on the one hand and by the distribution of the chemical components of the quartz glass on the other hand. Some of the chemical components to be paid attention to with respect to homogeneity are the hydroxyl groups (OH), the Si—H groups (SiH) and molecularly dissolved hydrogen ($H_2$). A basic prerequisite for homogeneous quartz glass is that said components are homogeneously distributed within the $SiO_2$ network. The local concentration of the components OH, Si—H and $H_2$ at any desired point "X" within the blank is obtained due to a balanced reaction which can be described as follows:

$$\text{Si—O—Si} + H_2 \leftrightarrows \text{Si—OH} + \text{Si—H} \qquad (1)$$

The position of the equilibrium depends on the temperature, the OH—, SiH— and the hydrogen concentration. Apart from the local temperature, particular attention must here be paid to the local hydrogen concentration because this concentration can be strongly influenced by outdiffusion during annealing on account of the high diffusion constant of hydrogen in quartz glass, whereas the OH concentration is hardly influenced by the annealing process.

The invention exploits the finding that the position of the chemical equilibrium according to equation (1) has not only direct impacts on the homogeneity of the quartz glass, but also influences the setting of the fictive temperature. It has been found that a homogeneous distribution of the fictive temperature can only be achieved if the position of the balanced reaction (1) is homogeneously distributed at the same time.

Since both the fictive temperature and the chemical equilibrium according to (1) depend on the concentration of the participating components and also on the absolute temperature, an ideal temperature distribution is one that is as homogeneous as possible at any time during annealing (in particular during the cooling phase), on the boundary condition that the absolute concentrations of said chemical components are also homogeneously distributed in the blank at the beginning of the process. However, the setting of the equilibrium distribution of temperature and hydrogen is counteracted by the heat conduction of the blank on the one hand and by the diffusion of hydrogen in quartz glass on the other hand.

Nevertheless, the cylindrical plate geometry of the blank which has so far been standard during temperature treatment can also be improved under these boundary conditions, for the plate geometry is not suited for achieving a homogeneous distribution of said components and a homogeneous temperature distribution in the area of the contour of the member for the following reasons:

1. When a quartz glass blank is cooled, a temperature gradient is automatically obtained which ascends from the interior to the exterior and descends in said direction during the heating-up phase. Therefore, a locally different chemical equilibrium according to equation (1) is automatically obtained within the quartz glass blank in dependence upon the local temperature.
2. In the course of the temperature treatment the hydrogen content decreases because of outdiffusion within the quartz glass blank (unless outdiffusion is counteracted, e.g. by maintaining a sufficiently high partial $H_2$ pressure in the ambient atmosphere). In this process the areas of the quartz glass blank near the surface are first depleted with formation of a concentration gradient from the interior to the exterior, which also results in a locally different setting of the chemical equilibrium (1).
3. A temperature gradient according to 1, as well as a concentration gradient and, as a consequence, a locally different chemical equilibrium (1) according to 2, result in a locally different viscosity. The viscosity, in turn, has also an effect on the setting of the local network structure of the quartz glass and thus on the fictive temperature, so that local differences in the viscosity curve over time also result in an inhomogeneous distribution of the fictive temperature.

The effects described under 1, to 3. (temperature gradient, concentration gradient, locally different viscosity curve), which are disadvantageous with respect to homogeneity, are reduced in the method according to the invention by a thickened portion extending around the outer edge. Within this thickened portion the distance between lower side and upper side, and thus the distance between the contour of the member and the free surface, is larger than in the area of the center axis of the blank. The thickened portion begins in the area of the outer edge, i.e. directly on or slightly behind the same, and extends from there over the whole surface of the blank or a part thereof towards the center axis.

"Contour of the member" means the area of the blank which is reduced by the overdimension and from which the optical member is made in the end. The contour of the member is of a rectangular shape surrounding the dimensions of the optical member.

The thickened portion forms part of the overdimension of the blank. According to the invention the overdimension is here larger on the peripheral portion than in the central portion. It has been found that smaller temperature gradients are formed in the area of the contour of the member due to such an accumulation of quartz glass mass in the peripheral portion of the blank during cooling in the process of the temperature treatment. Peripheral effects which may promote an outdiffusion of hydrogen are minimized because a substantial part of the mass of the blank is concentrated in the peripheral portion. The diffusion of hydrogen out of the area of the member contour is thereby reduced, resulting in this portion in a smaller gradient of the hydrogen concentration. In the end the thickened portion does not significantly increase the overall mass of the blank and the material factor because the additional overdimension can substantially be limited to the edge of the blank.

The geometry of the outer edge of the blank is not decisive for the success of the teaching according to the invention. The outer edge will normally form the edge between upper side or lower side and an outer cylindrical surface; however, it can e.g. also constitute an inwardly or outwardly curved or tapering lateral boundary of the blank.

The thickness of the thickened portion is larger in the area of the outer edge than in the area of the center axis. Accordingly, the distance between lower side and upper side decreases from the edge to the interior. The distance may be shortened in one or several steps. However, it has been found to be of particular advantage when the distance between lower side and upper side decreases continuously across the thickened portion when viewed from the outer edge towards the center axis. Thus, the thickened portion decreases continuously from the outside to the inside over at least a part of the surface of the blank. The continuity of the decrease in the thickened portion counteracts the formation of sudden changes in temperature or concentration within the blank, in particular within the contour of the member. Moreover, the material factor is thereby kept low.

It has turned out to be of particular advantage when the distance decreases faster (more) than linearly. The decrease is e.g. in accordance with an exponential or parabolic function. The thickened portion is here a concave curve from the outside to the inside (hereinafter called "concave annealing form"). It has been found that a concave annealing form during heating and cooling yields a temperature profile which is particularly homogeneous in time and space and has a small gradient within the contour of the member. In comparison with the known blank in the form of a cylinder-shaped plate, as described at the outset, a concave annealing form yields a smaller time change in the heat flow and thus a more homogeneous temperature profile along any desired radial axis within the blank. This is not only an important precondition for the production of low-stress blanks, but also for a homogeneous extension of the position of the chemical equilibrium according to equation (1).

It is true that a spatial temperature gradient can also not be avoided in the case of a concave annealing form. However, on account of the more uniform heat flow during cooling or heating, the maximum temperature difference in the area of the contour of the member is much smaller in the case of a concave annealing form than in a plate-like preform, so that a rather flat temperature distribution is obtained. At the same time, this constitutes a suitable precondition for a more homogeneous distribution of the position of the equilibrium (1) within the contour of the member.

Furthermore, the formation of a gradient of the hydrogen concentration can also not be prevented in the case of a concave annealing form. Nevertheless, a concave annealing form within the contour of the member yields a more homogeneous hydrogen distribution than in the case of a plate-like form. This can be attributed to the fact that the concave annealing form leads to an extension of the mean diffusion path length together with an adjustment of the diffusion path lengths along any radial axes within the blank. In comparison with the plate-like form, this results in a narrower distribution of the diffusion path lengths.

In the final analysis, all of these points contribute to the fact that with a concave annealing form the position of the equilibrium (1) along any radial axis within the blank, and thus also the distribution of the fictive temperature and the viscosity curve over time along said axis, are more homogeneous than in a plate-shaped blank.

Instead of the above-explained exponential or parabolic decrease in the distance between lower side and upper side across the thickened portion, the distance in an alternative, but equally preferred embodiment of the blank of the invention decreases linearly (hereinafter also called linear annealing form). With a temperature treatment using a linear annealing form, the effects regarding the formation of a smaller gradient of the temperature and hydrogen concentration within the blank, and the distribution of the position of the equilibrium (1) within the contour of the member are smaller than in the case of the concave annealing form, but the linear annealing form is easier to manufacture and therefore particularly suited for applications of the optical member where lower demands are made on optical homogeneity.

Preferably, the thickened portion begins on the outer edge. As a result, overdimension and thus material factor and manufacturing costs can be kept small.

Furthermore, it has been found to be of advantage when the thickened portion extends from the center axis to the outer edge. This results in a simplified manufacture of the blank, and geometrical steps and accompanying sudden changes in physical and chemical parameters, which might contribute to optical inhomogeneities, are avoided. Moreover, the above-explained advantageous effect of the thickened portion with respect to a reduction of temperature gradient, concentration gradient and locally different viscosity curve within the contour of the member can be observed over the whole cross-section thereof.

An embodiment of the blank is preferred in which the lower side and the upper side are provided with a thickened portion. The thickened portions facing one another at the lower side and the upper side are normally of a similar or ideally identical geometry. In the last-mentioned case the blank exhibits mirror symmetry, the mirror plane extending in a direction perpendicular to the center axis and in the center between lower side and upper side. The symmetry of the blank facilitates an adjustment of the homogeneity in the optical member, in particular the adjustment of a symmetrical curve of the refractive index.

As for the vessel, the above object is achieved according to the invention starting from the above-mentioned vessel in that said upper side and said lower side in the area of said center axis have a higher thermal conduction than in the area of said outer edge.

The vessel for heat-treating synthetic quartz glass for optical use according to the present invention is utilized for the heat treatment of a synthetic quartz glass blank as an object to be treated, said synthetic quartz glass blank being enclosed inside said vessel in such a manner that $SiO_2$ powder is filled therein and subjected to heat treatment in a heating furnace; wherein, the space for enclosing the synthetic quartz glass object is flat and cylindrical in shape, and, when seen the vessel as a whole with flat cylindrical synthetic quartz glass to be treated being enclosed and with $SiO_2$ powder filling the interstices, the degree of heat emission at the center is set higher or lower than that of the surroundings in order to exhibit the function described hereinafter. Since a conventionally employed heating furnace is readily applicable, further explanation thereof is omitted hereinafter.

The cooling rate during annealing of a quartz glass blank is made non uniform by the vessel according to the invention. This shows advantageous effects with respect to the formation of a smaller gradient of the temperature and the hydrogen concentration within the blank and with respect to the distribution of the position of the equilibrium within the contour of the optical member to be produced from it. In this respect reference is made to the above explanations regarding the blank of the invention and the preferred developments thereof.

(1) The vessel according to the invention is a vessel for heat-treating a cylindrical blank for an optical member of synthetic quartz glass, which includes the contour of said optical member with an overdimension and comprises an interior for receiving said blank and $SiO_2$ powder for filling intermediate spaces, said interior having a removable upper side and a lower side opposite said upper side and spaced apart therefrom, and an outer edge connecting upper side and lower side and extending around a center axis, characterized in that said upper side and said lower side in the area of said center axis have a higher thermal conduction than in the area of said outer edge.

It shows the features according to the following preferred embodiments (2) The vessel described in (1), wherein lower side and upper side in the area of said outer edge have a larger wall thickness than in the area of said center axis.

(3) The vessel described in (2), wherein upper side and lower side are each equipped with a surrounding thickened portion which begins in the area of said outer edge and extends towards said center axis and in which the wall thickness is greater than in the area of said center axis.

(4) The vessel described in (3), wherein the wall thickness of lower side and upper side decreases continuously across said thickened portion when viewed from said outer edge towards said center axis.

(5) The vessel described in (4), wherein said wall thickness decreases faster than linearly.

(6) The vessel described in (4), wherein said wall thickness decreases linearly.

(7) The vessel described in (3), wherein the wall thickness of lower side and upper side decreases in steps across said thickened portion when viewed from said outer edge towards said center axis.

(8) The vessel described in (2), wherein the wall thickness of upper side and lower side is reduced by recesses whose number, depth or width is each time larger in the area of said center axis than in the area of said outer edge, with the proviso that said upper side and said lower side have a higher thermal conduction in the area of said center axis than in the area of said outer edge.

(9) The vessel described in (1), wherein said interior is defined by walls of quartz glass.

(10) The vessel described in (9), wherein said upper side and said lower side are made from quartz glass of a higher thermal conductivity, and said outer edge from quartz glass of a lower thermal conductivity.

(11) The vessel described in (1), wherein said $SiO_2$ powder is a synthetically produced $SiO_2$ powder having a sodium content of less than 30 wt. ppb.

(12) The vessel described in (1), wherein said $SiO_2$ powder is a synthetically produced $SiO_2$ powder having a hydrogen content of at least $1.0 \times 10^{19}$ molecules/cm$^2$.

(13) The vessel described in (1), wherein the outer diameter of said upper side is smaller than the inner diameter of said outer edge.

As for the method, the above-mentioned object starting from the above-mentioned method is achieved according to the invention in that measures are provided which during cooling keep the heat conduction in the area of said outer edge lower than in the area around said center axis.

The method shows the advantageous effects with respect to the formation of a smaller gradient of the temperature and the hydrogen concentration within the blank and with respect to the distribution of the position of the equilibrium (1) within the contour of the member. In this respect reference is made to the above explanations regarding the blank of the invention and the preferred developments thereof.

According to a first aspect of the method, the measures which during cooling keep the heat conduction in the area of said outer edge lower than in the area around said center axis consist in using a blank as described above, which is a blank for an optical member of quartz glass which includes a contour of said optical member with an overdimension and the surface of which is defined by a lower side, an upper side opposite said lower side and spaced apart therefrom and by an outer edge extending around a center axis. The blank is characterized by that there is provided a surrounding thickened portion which begins in the area of said outer edge and extends towards said center axis, and in which the distance between lower side and upper side is greater than in the area of said center axis.

The blank according to the invention is characterized by a surrounding thickened portion which begins in the area of the outer edge and extends in the direction of the center axis and in which the distance between lower side and upper side is greater than in the area of the center axis of the blank. When a blank of such a configuration is subjected to an annealing treatment for eliminating mechanical stresses, the thickened portion develops advantageous effects with respect to the formation of a smaller gradient of the temperature and the hydrogen concentration within the blank and with respect to the distribution of the position of the equilibrium (1) within the contour of the member. In this respect reference is made to the above explanations regarding the blank of the invention and the preferred developments thereof.

According to a second aspect of the method, the measures which during cooling keep the heat conduction in the area of said outer edge lower than in the area are measures consist in introducing said blank into a vessel as described above, which is a vessel for heat-treating a cylindrical blank for an optical member of synthetic quartz glass, which includes the contour of said optical member with an overdimension and comprises an interior for receiving said blank and $SiO_2$ powder for filling intermediate spaces, said interior having a removable upper side and a lower side opposite said upper side and spaced apart therefrom, and an outer edge connecting upper side and lower side and extending around a center axis, wherein said upper side and said lower side in the area of said center axis have a higher thermal conduction than in the area of said outer edge. The preferred method additionally comprises filling intermediate spaces between said blank and said vessel with $SiO_2$ powder and in subjecting said blank surrounded by said $SiO_2$ powder in said vessel to a thermal treatment by introducing said vessel into a furnace and by heating and subsequently cooling the same.

BRIEF DESCRIPTION OF THE DRAWINGS

The invention shall now be explained in more detail with reference to embodiments and a drawing. The drawing is a schematic illustration showing in detail in FIG. 1 A diagram showing a heat treatment vessel according to an embodiment of the present invention together with a synthetic quartz glass body to be treated and with $SiO_2$ powder, wherein (A) shows a vertical cross section view, and FIG. 1(B) shows a cross section view taken along line B—B in FIG. 1(A), FIG. 2 A diagram showing the temperature distribution with cooling obtained on the case according to the present invention and in a prior art example, wherein (A) shows a case of the present example and (B) shows a case of a prior art example, FIG. 3 A diagram showing the fluctuation in refractive index $\Delta n$ of a synthetic quartz glass for optical use achievable in the present example and in a prior art example, wherein (A) shows a case of the present example and (B) shows a case of a prior art example, FIG. 4 A vertical cross section of a heat treatment vessel according to another embodiment of the present example, FIG. 5 A vertical cross section of a heat treatment vessel according to a still other embodiment of the present example, FIG. 6 A vertical cross section of a heat treatment vessel according to a yet other embodiment of the present example, FIG. 7 A diagram showing an example of a temperature profile employed in the heat treatment method for a synthetic quartz glass for optical use according to the present invention, FIG. 8 A vertical cross section of a heat treatment vessel used in Example 1, FIG. 9 A vertical cross section of a heat treatment vessel used in Example 2, FIG. 10 A vertical cross section of a heat treatment vessel used in Example 3, FIG. 11 A diagram showing the table provided therein the optical properties and the like for the Examples and Comparative Examples, FIG. 12 a first embodiment of a blank according to the invention for an optical member, in a side view, FIG. 13 a blank for an optical member according to the prior art, in a side view, FIG. 14 a second embodiment of a blank according to the invention for an optical member, in a side view, and FIG. 15 a further embodiment of a blank according to the invention for an optical member, in a side view.

DETAILED DESCRIPTION

Referring to the attached drawings, a specific example of the vessel 10 for use in the heat treatment is described below.

Figure 1:
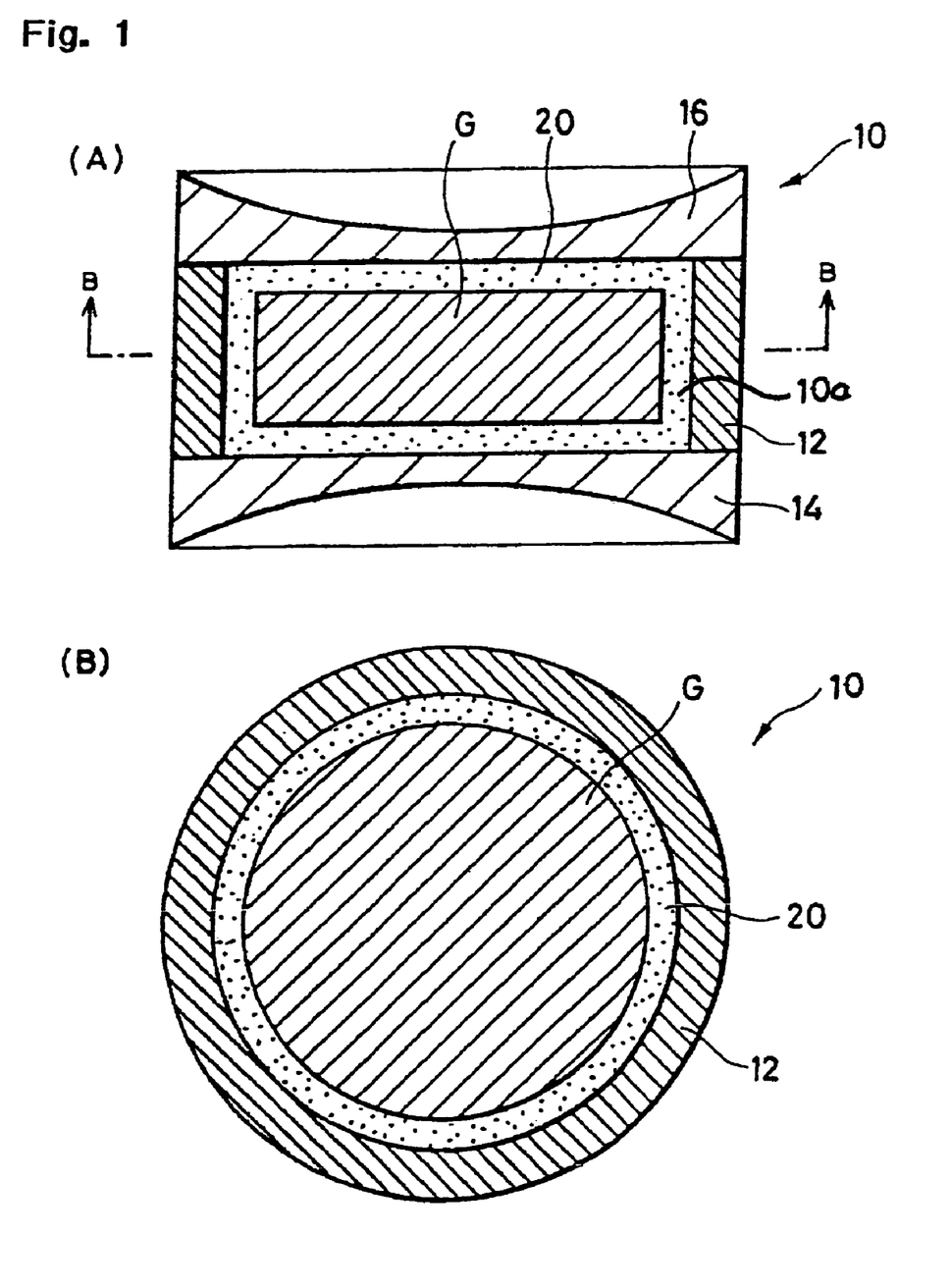

Referring to FIG. 1, the vessel 10 for heat treatment comprising a cylindrical enclosing space 10a similar to the flat cylindrical synthetic quartz glass blank G to be enclosed therein, and is equipped with a circular side wall 12, a bottom plate 14 constituting a bottom wall, and a lid 16 constituting an upper wall. The circular side wall 12 and the bottom plate 14 may be provided separated or integrated into a monolithic body.

The volume of the enclosing space 10a of the vessel 10 for heat treatment is provided 1.5 times or larger than the volume of the synthetic quartz glass blank to be treated, and particularly preferably, it is provided at a volume 2 to 10 times as large as that of the synthetic quartz glass blank.

Since the synthetic quartz glass blank G to be treated is provided at a diameter of from 50 to 200 mm and a thickness of about 30 to 200 mm, the volume of the space 10a for enclosing the object is, preferably, in a range of from 450 to 250000 $cm^3$.

The bottom plate 14 and the lid 16 above each have a concave lens-like shape on one side. The curved plane of the concave plane provided on one side may be a secondary curved plane, a spherical plane, or an aspheric plane. The degree of concave of the spherical plane is determined by measuring the rate of heat emission of various portions on cooling, i.e., the difference in cooling rate. This is described hereinafter.

The Na content of the vessel 10 for heat treatment preferably contains Na at a concentration of 100 ppb or less, particularly preferably 40 ppb or less, and further preferably, 5 ppb or less. Although the amount of Na that reaches the synthetic quartz glass blank G is limited because Na discharged from the vessel, etc., is mostly trapped by the $SiO_2$ powder described hereinafter, the Na content of the vessel 10 above is preferably limited in the range above.

Further, in the present invention, the vessel 10 for heat treatment above is filled with $SiO_2$ powder 20 (see FIG. 1) in such a manner that it covers the surroundings of the synthetic quartz glass blank G that is the object to be treated. As the $SiO_2$ powder, there can be used a $SiO_2$ powder doped with hydrogen, which is obtained by previously subjecting the powder to a high pressure hydrogen treatment. In this case, the concentration of hydrogen molecules that are dissolved in the hydrogen-doped $SiO_2$ powder is preferably $1 \times 10^{19}$ molecules/$cm^3$ or higher, particularly preferably, 2 to $5 \times 10^{19}$ molecules/$cm^3$, in average. The concentration of the dissolved hydrogen molecules may be taken by the average over the entire $SiO_2$ powder, and hence, the powder thus doped with hydrogen may be used mixed with a powder not doped with hydrogen.

The $SiO_2$ powder is provided to prevent hydrogen molecules from escaping from the synthetic quartz glass blank G that is heat treated as the object of the heat treatment. The total weight of the $SiO_2$ powder above preferably accounts for 25% or more, more preferably, for 50 to 200%, of the total weight of the synthetic quartz glass blank to be treated. If the total weight of the $SiO_2$ powder above should account for less than 25%, it becomes difficult to sufficiently achieve the object of preventing the discharge of hydrogen molecules from the synthetic quartz glass blank; if the total weight should exceed 200%, industrial excess generates as to impair the efficiency of the process.

The Na content of the $SiO_2$ powder above is preferably 30 ppb or lower, and particularly preferably, 10 ppb or lower. Although it is better for the lower the content of Na, the lower limit at present is about 5 ppb.

The $SiO_2$ powder above consists of particles in which 95% by weight or more thereof have a particle diameter in a range of, preferably, from about 0.1 to 1,000 $\mu$m, and more preferably, in a range of from about 0.5 to 500 $\mu$m. If a particle with a size more than 100 $\mu$m should be mixed, there is fear of making it impossible to dissolve sufficient amount of hydrogen molecules into a part of the powder during the high pressure hydrogen treatment; on the other hand, if a particle with a size less than 0.1$\mu$m should be mixed, there occurs a problem in handling, and this is not preferred. Furthermore, if the particle size of the powder becomes too large, it becomes difficult to achieve a sufficiently high packing density; hence, it is preferred that a powder containing particles exceeding 1,000 $\mu$m in particle diameter is not used. By also taking this point into consideration, it is preferred not to use a powder containing particles exceeding 1,000 $\mu$m in particle diameter. However, powders differing in particle size may be mixed so long as the particle diameter falls within a range of from 0.1 to 1000 $\mu$m, and it is more preferred to use a powder having a wider range in particle diameter, because such a powder often increases the packing properties. However, the effect of the present invention can be achieved so long as the particle diameter of the $SiO_2$ powder used substantially falls within the range above. More specifically, there is no practical problem even if less than 5% of the entire weight of the $SiO_2$ powder above should fall outside of the particle size range defined above.

In view of the conditions above, it is particularly preferred that the $SiO_2$ powder above is a synthetic quartz glass powder.

The method for heat treating a synthetic quartz glass for optical use by performing a heat treatment in the heating furnace according to the present invention comprises using the vessel for heat treatment described above, while covering the surroundings of the synthetic quartz glass blank to be treated with $SiO_2$ powder. The heat treatment may be carried out in air. The temperature and the time of retention, the heating rate, the cooling rate, and other thermal treatment conditions may be set similar to those generally used in an ordinary heat treatment.

Figure 2:
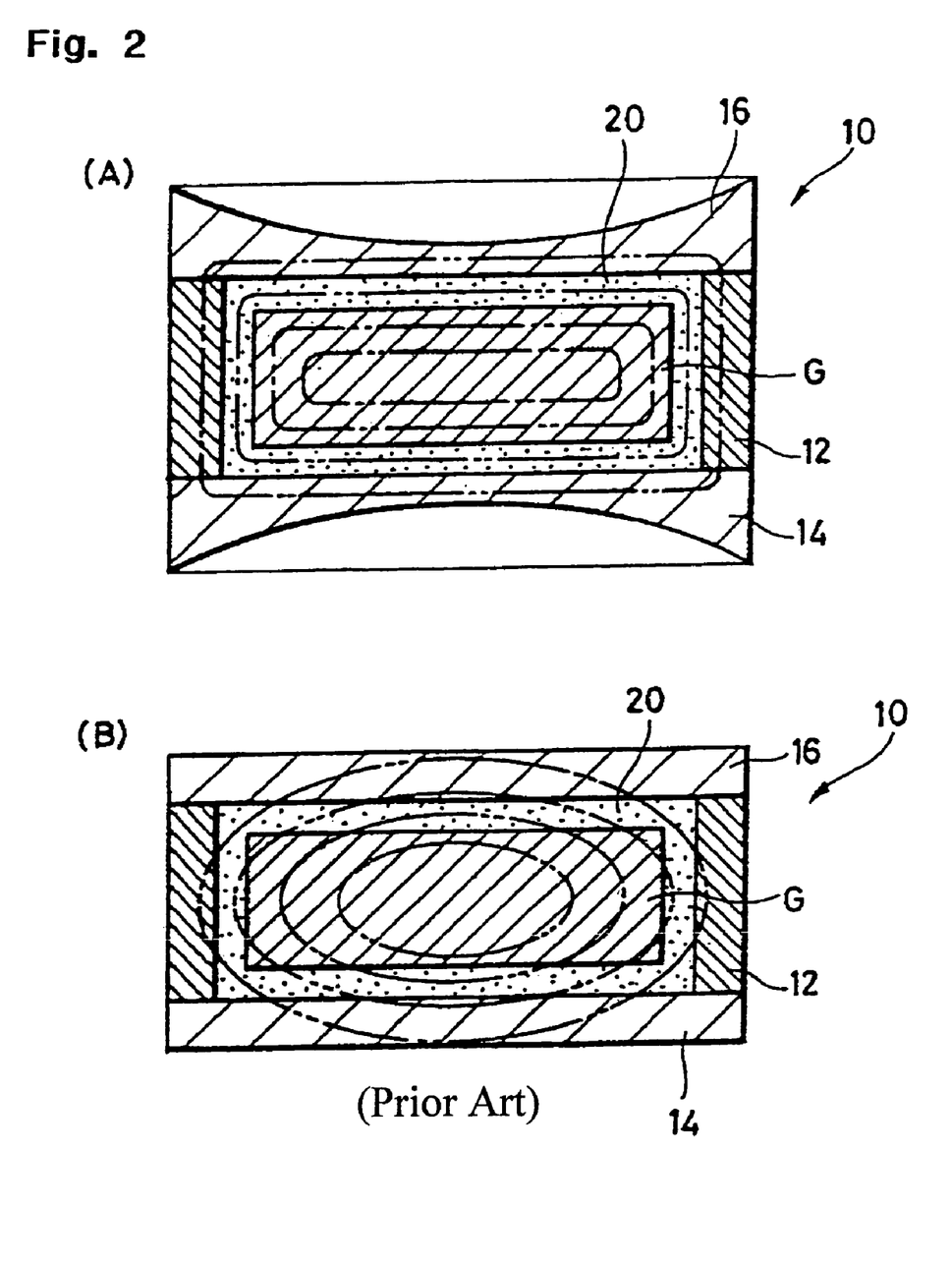
Figure 3:
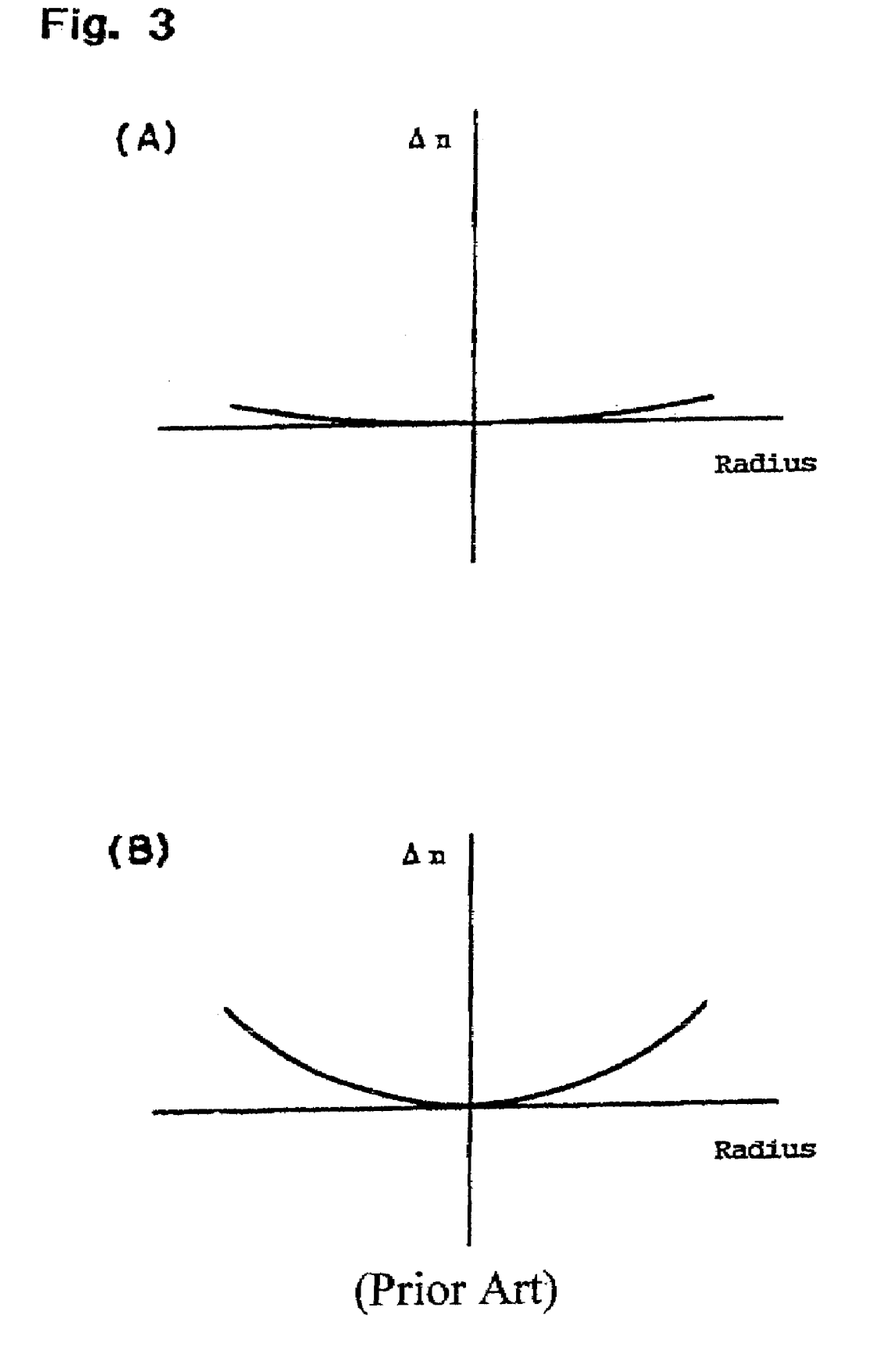

In accordance with the present invention, there can be obtained a synthetic quartz glass for optical use having a fluctuation in refractive index $\Delta n$ of $1.0 \times 10^{-6}$ or less along the direction of the radius. Such an effect is achieved in the present invention, because, as is shown by dots and lines in FIG. 2(A), the use of the vessel for heat treatment above achieves an approximately uniform cooling rate in the direction of the radius (of the entire structure inclusive of the vessel for heat treatment, the synthetic quartz glass blank, and the $SiO_2$ powder) during cooling. In contrast to this, in case of using a vessel having a bottom plate and a lid of a uniform thickness, as shown in FIG. 2(B), the cooling rate generally tends to become higher for the surroundings as compared with the central portion while the density of the material increases towards the peripheral portions. Hence, the fluctuation in refractive index $\Delta n$ increases as is shown in FIG. 3(A). In accordance to the present invention, on the contrary, the fluctuation in refractive index $\Delta n$ can be minimized as shown in FIG. 3(B).

As described above, in accordance with the present invention, the fluctuation in refractive index $\Delta n$ along the direction of the radius of the synthetic quartz glass for optical use can be controlled by controlling the cooling rate in each of the portions. Thus, in case of using a plurality of glasses in combination, they can be assembled in such a manner to correct the fluctuation in refractive index $\Delta n$ of other glasses.

Figure 4:
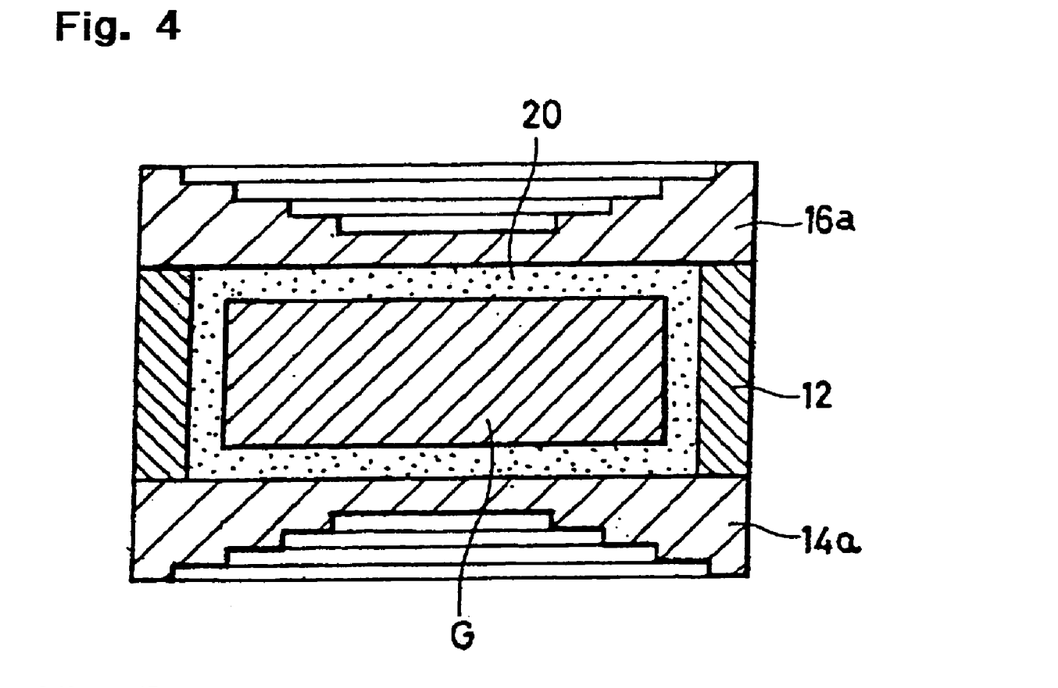
Figure 5:
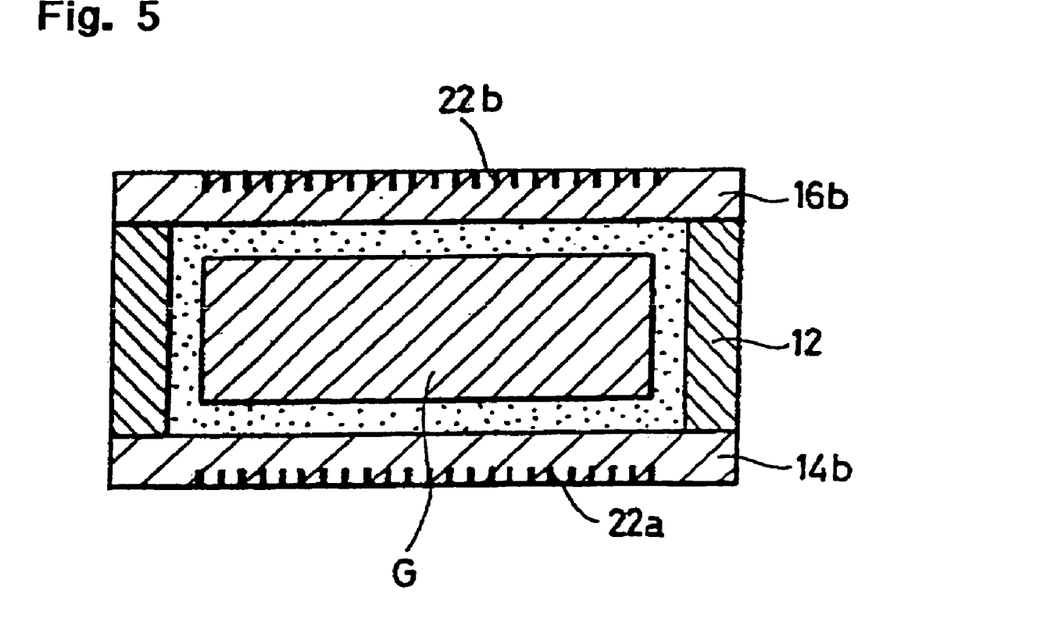

To set the cooling rate of the synthetic quartz glass blank to be treated (i.e., of the entire structure inclusive of the vessel for heat treatment, the synthetic quartz glass blank, and the $SiO_2$ powder) uniform along the direction of radius during cooling by a method other than that described above, the cross section of the bottom plate 14a and the lid 16a may be provided in a step-wise morphology as shown in FIG. 4; otherwise, as shown in FIG. 5, there can be employed means such as providing slits 22a and 22b to the central portion of the bottom plate 14a and the lid 16a.

Figure 6:
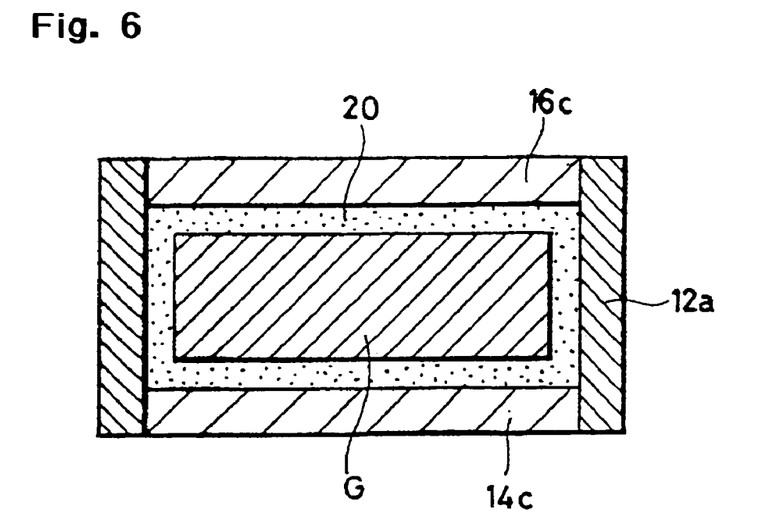

Furthermore, as shown in FIG. 6, the diameter of the bottom wall 14c and the upper wall 16c may be set slightly smaller than the inner diameter of the side wall 12a, while constituting the bottom wall 14c and the upper wall 16c with a quartz glass having a relatively high degree of heat emission and employing a quartz glass having a relatively low degree of heat emission for the side wall 12a. As a quartz glass having a relatively high degree of heat emission, there can be mentioned a transparent quartz glass, and, as a quartz glass having a relatively low degree of heat emission, there can be mentioned an opaque quartz glass.

In case the bottom plate and the lid are provided at a uniform thickness, the present inventors knew through experience that, depending on the temperature conditions and the like during cooling, there occurs a case in which the cooling rate at the central portion of the synthetic quartz glass blank to be treated becomes higher.

In such a case, it is preferred to control the cooling rate by setting the thickness and the like of the bottom plate and the lid reversed to the case above.

More specifically, in enclosing the flat cylindrical synthetic quartz glass blank to be treated in the vessel with $SiO_2$ powder filling the interstices and considering the whole structure, the degree of heat emission of the central portion may be set higher than that of the peripheral portion depending on the cooling conditions. In such a case, for instance, the bottom wall and the upper wall may be provided in a convex shape, the thickness of the central portions of the bottom wall and the upper wall is increased in a step-wise manner toward the center portion, or the thickness of the central portions of the bottom wall and the upper wall may be set larger than that of the peripheral portions. Otherwise, in case of a shape shown in FIG. 6 above, the bottom wall and the upper wall may be constructed from a quartz glass having a relatively high degree of heat emission while constructing the side wall with a quartz glass having a relatively low degree of heat emission.

The synthetic quartz glass for optical use available by the present invention contains dissolved hydrogen molecules at a concentration of $2.0 \times 10^{17}$ molecules/cm$^3$ or higher, and yields an initial transmittance of 99.7% or higher for a radiation 193.4 nm in wavelength. Particularly preferably, the concentration of dissolved hydrogen molecules is $5 \times 10^{17}$ molecules/cm$^3$ or higher. If the concentration of dissolved hydrogen molecules should be lower than $2 \times 10^{17}$ molecules/cm$^3$, the desired resistance against laser radiation cannot be achieved. The upper limit of the concentration of the dissolved hydrogen molecules at present is approximately $5 \times 10^{19}$ molecules/cm$^3$.

In the synthetic quartz glass for optical use available by the present invention, the content of Na is preferably 10 ppb or lower, and particularly preferably, 5 ppb or lower. The fluctuation in refractive index $\Delta n$ along the direction of radius is preferably $1.0 \times 10^{-6}$ or lower.

An embodiment for practicing the present invention is described more specifically below by partly making reference to the drawings. However, it should be understood that the size, materials, shapes, relative arrangement, etc., that are described in the embodiment below are provided simply as examples or explanatory means unless otherwise described, and are by no means limiting the present invention.

Figure 7:
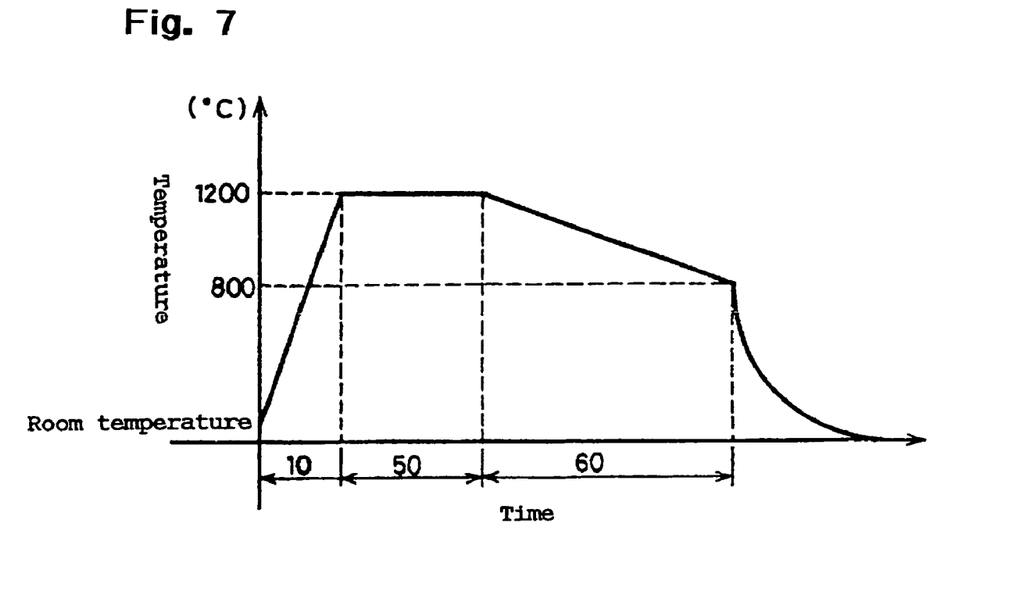

As samples of synthetic quartz glass for use as an optical member, four synthetic quartz glass bodies (objects to be treated) each 200 mm in outer diameter and 60 mm in thickness prepared by direct method were prepared. The synthetic quartz glass bodies all contained Na at a concentration of 5 ppb or lower and hydrogen molecules ($H_2$) at a concentration of $1.8 \times 10^{18}$ molecules/cm$^3$, and yielded an initial transmittance of 99.8% for a radiation 193.4 nm in wavelength. These samples were treated in the air in the following manner in accordance with the temperature profile shown in FIG. 7.

EXAMPLE 1

Figure 8:
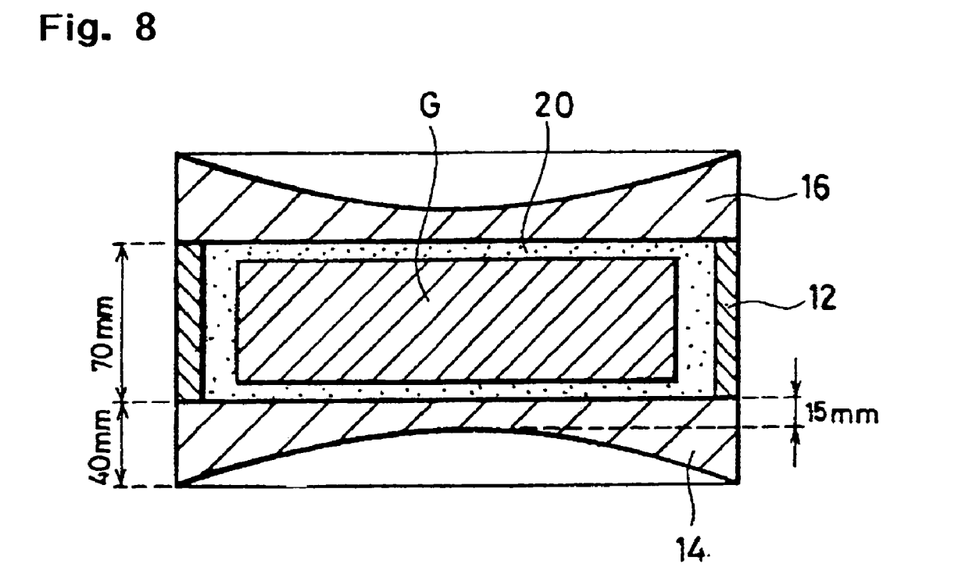

Referring to FIG. 8, there was used a synthetic quartz glass vessel, which comprises a bottom plate 14 and a lid 16 each provided with a concave (spherical) lens shape on one side and having an outer diameter of 250 mm, a maximum thickness of 40 mm and a minimum thickness of 15 mm, and provided with a side wall 5 mm in thickness. A synthetic quartz glass body, i.e., the object of the treatment, was placed at the center of the vessel, and 2.9 kg of powder consisting of particles 63 to 710 μm in size was filled to bury the synthetic quartz glass body. Then, the heat treatment above was applied to the synthetic quartz glass body. More specifically, the synthetic quartz glass body was subjected to heat treatment by placing it in a heat treatment furnace in the state shown in FIG. 8. Thus, the total weight of the synthetic quartz glass powder accounted for 70% of the weight of the synthetic quartz glass body.

EXAMPLE 2

Figure 9:
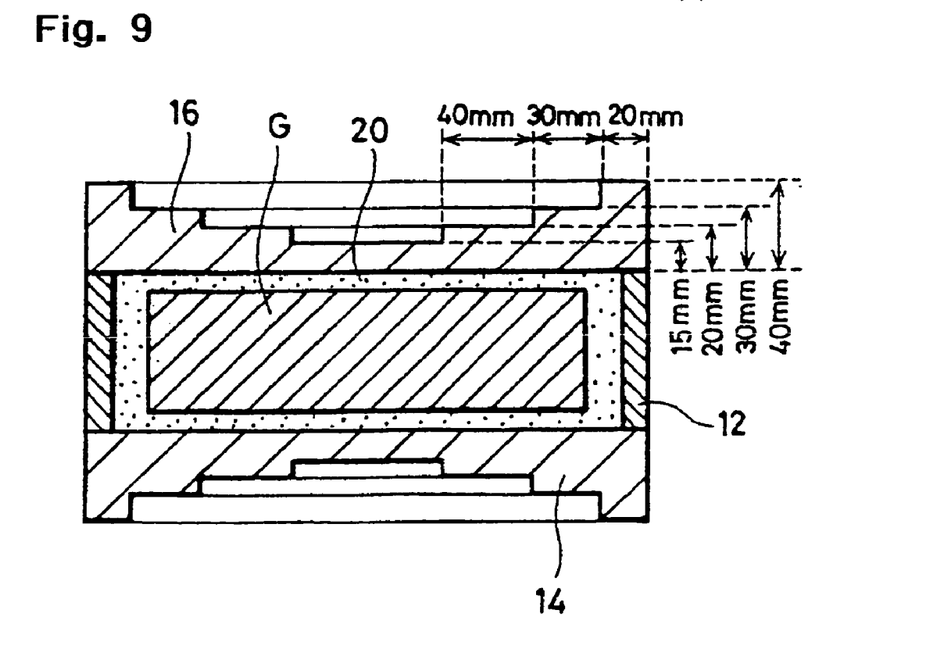

As shown in FIG. 9, a synthetic quartz glass body was subjected to a heat treatment in a manner similar to Example 1 above except for using a vessel comprising a bottom plate 14 and a lid 16 having a step-wise shape on one side.

EXAMPLE 3

Figure 10:
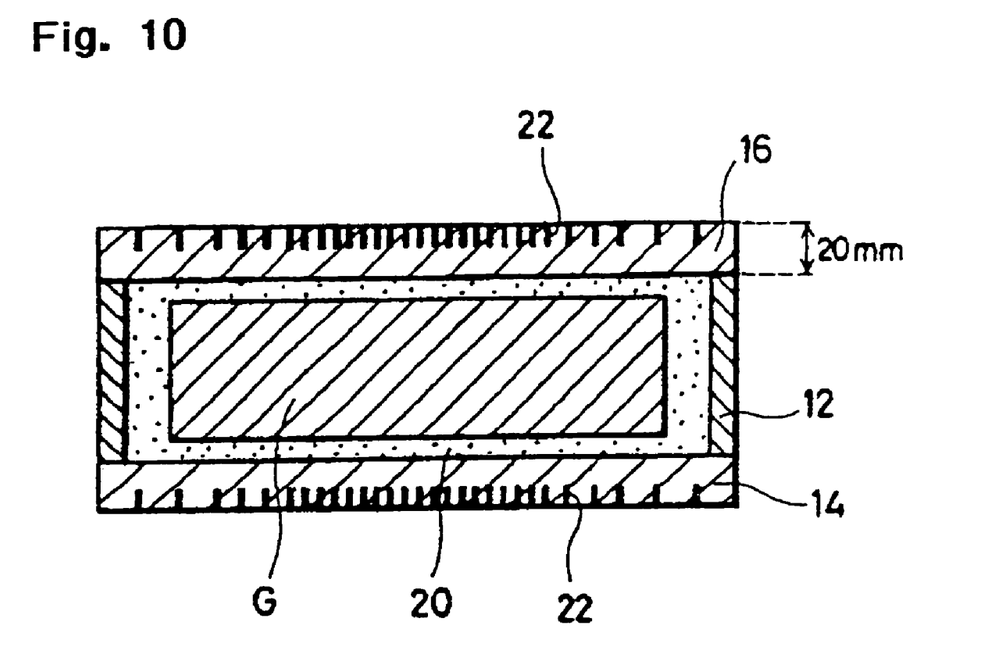

As shown in FIG. 10, a synthetic quartz glass body was subjected to a heat treatment in a manner similar to Example 1 above except for using a vessel comprising a bottom plate 14 and a lid 16 each provided with slits on one side (at a slit interval of 5 mm for the portion corresponding from the center to a radius of 50 mm, at a slit interval of 10 mm for the portion 50 to 80 mm in radius, at a slit interval of 15 mm for the portion 80 to 110 mm in radius, and no slits for the portion exceeding 110 mm in radius).

COMPARATIVE EXAMPLE 1

A synthetic quartz glass body was subjected to a heat treatment in a manner similar to Example 1 above except for using a vessel comprising a bottom plate and a lid with a uniform thickness of 15 mm instead of the bottom plate and the lid described above.

COMPARATIVE EXAMPLE 2

A synthetic quartz glass body was subjected to a heat treatment in a manner similar to Example 1 above except for using a vessel comprising a bottom plate and a lid with a uniform thickness of 40 mm instead of the bottom plate and the lid described above.

Then, measurements were performed on the heat treated synthetic quartz glass objects obtained in the Examples and Comparative Examples above to obtain the fluctuation in refractive index $\Delta n$ before and after the heat treatment, the birefringence after the heat treatment, an initial transmittance for a radiation 193.4 nm in wavelength, the concentration of hydrogen molecules ($H_2$) after the heat treatment, and the concentration of Na impurity.

Figure 11:
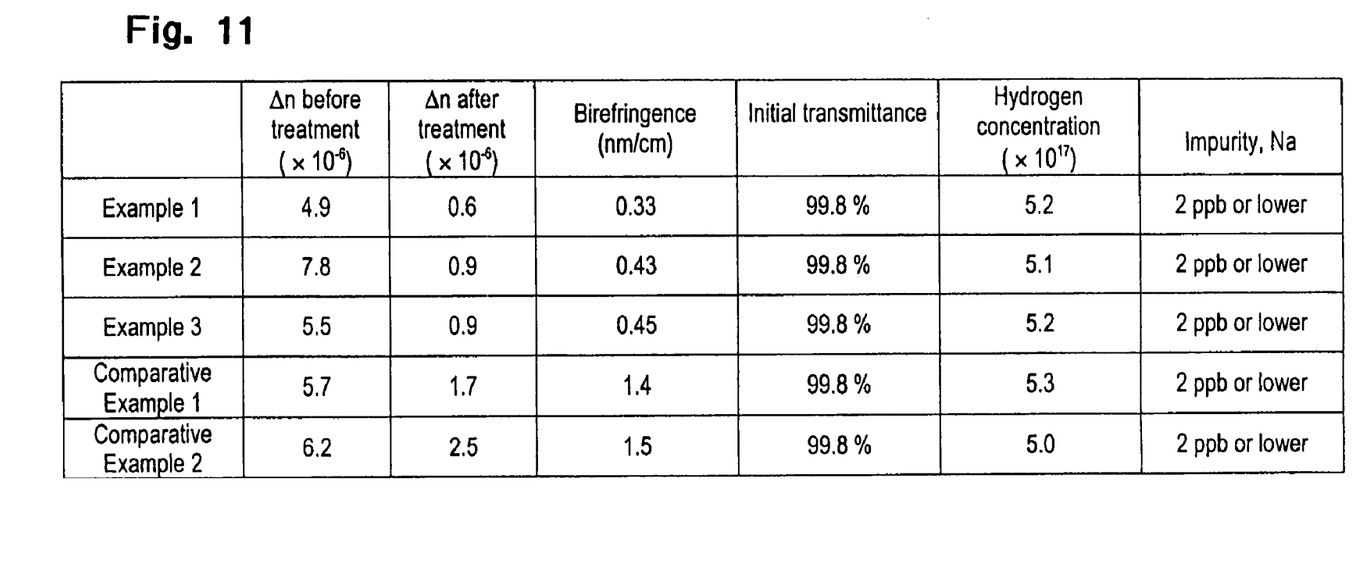

The table given in FIG. 11 clearly reads that, in the synthetic quartz glass for optical use obtained as the object of the treatment in accordance with the Examples 1–3, the fluctuation in refractive index $\Delta n$ is minimized to $0.9 \times 10^{-6}$ or even lower for the synthetic quartz glass G subjected to heat treatment. In contrast to this, the fluctuation in refractive index $\Delta n$ for the synthetic quartz glass G subjected to heat treatment in accordance with the Comparative Examples was found to be as large as $1.7 \times 10^{-6}$ or even higher. Furthermore, the birefringence of the synthetic quartz glass G subjected to heat treatment in accordance with the Examples 1–3 was lowered to a value 0.45 nm/cm or even lower. In contrast to this, the birefringence of the synthetic quartz glass G subjected to heat treatment in accordance with the Comparative Examples was found to be as large as 1.4 nm/cm or even higher.

In the Examples 1–3 and Comparative Examples, the other characteristics were approximately the same; the initial transmittance for a radiation 193.4 nm in wavelength was each 99.8%, the concentration of hydrogen molecules ($H_2$) after the heat treatment was each about $5 \times 10^{17}$ molecules/$cm^3$, and the Na concentration was each 2 ppb.

This method is extremely economical because it allows reuse of the vessel and the quartz powder.

Referring now to the blanks shown in FIGS. 12 to 15:

Blanks 31, 32, 33, 34 which are made from quartz glass and shown in FIGS. 12 to 15 are each substantially disc-shaped and configured to be rotationally symmetrical about a center axis 35. Furthermore, blanks 31, 32, 33, 34 are each in mirror symmetry along a mirror plane 36 extending in a direction perpendicular to the center axis 35 and the sheet plane. Each of blanks 31, 32, 33, 34 has an upper side 37, a lower side 38 and an outer edge 39. They include an inner portion with a contour 40 of the optical member to be produced from the blank, the member being surrounded on all sides with an overdimension 41. The distance between lower side 38 and upper side 37 in the area of the outer edge 39 is marked by a distance arrow A in each instance.

Figure 13:
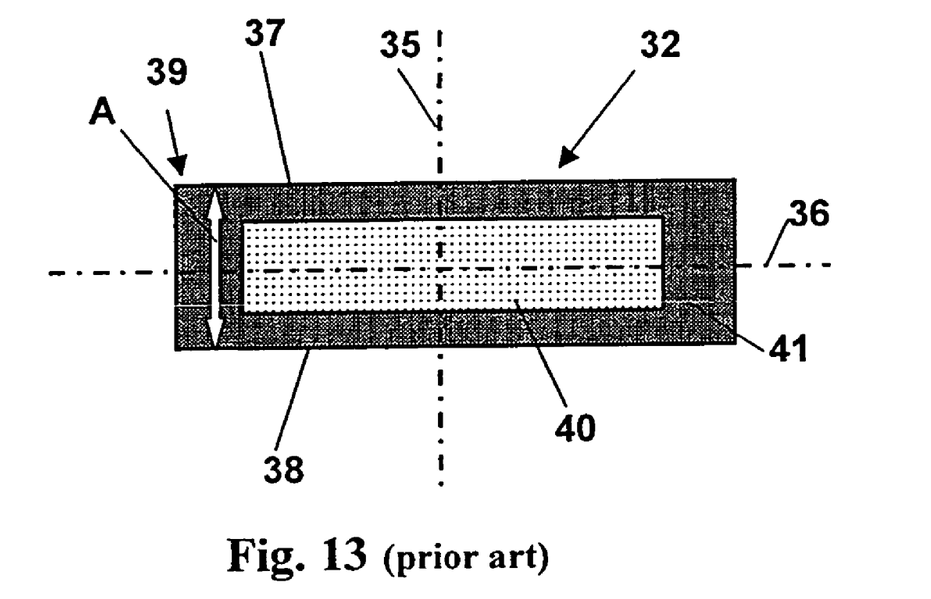

FIG. 13 illustrates a blank 32 as has so far been in use for producing lenses for microlithography. Blank 32 is characterized by a simple plate-shaped cylindrical geometry with an even upper side 37 and an even lower side 38. The distance between lower side 38 and upper side 37 is constant across the whole plate. During the annealing process for reducing mechanical stresses (in particular during cooling), such a geometry of the blank creates distinct temperature gradients from the surface to the interior, in particular from edge 39 to the interior; these can also be noticed within the area of the contour 40 of the member. In dependence upon the local temperature within the blank 32, this is accompanied by a locally different chemical equilibrium according to equation (1). Moreover, in the course of the temperature treatment the hydrogen content decreases because of out-diffusion, resulting in a concentration gradient from the interior to the exterior, which is again most strongly felt in the area of the edge 39 and accompanied by impacts within the contour 40 of the member. This concentration gradient also results in locally different settings of the chemical equilibrium (1) and of the viscosity. As a result, within the contour 40 there are areas of a different fictive temperature and of a different chemical composition which in the end appear as inhomogeneities, normally as refractive index variations, of the optical member.

Figure 12:
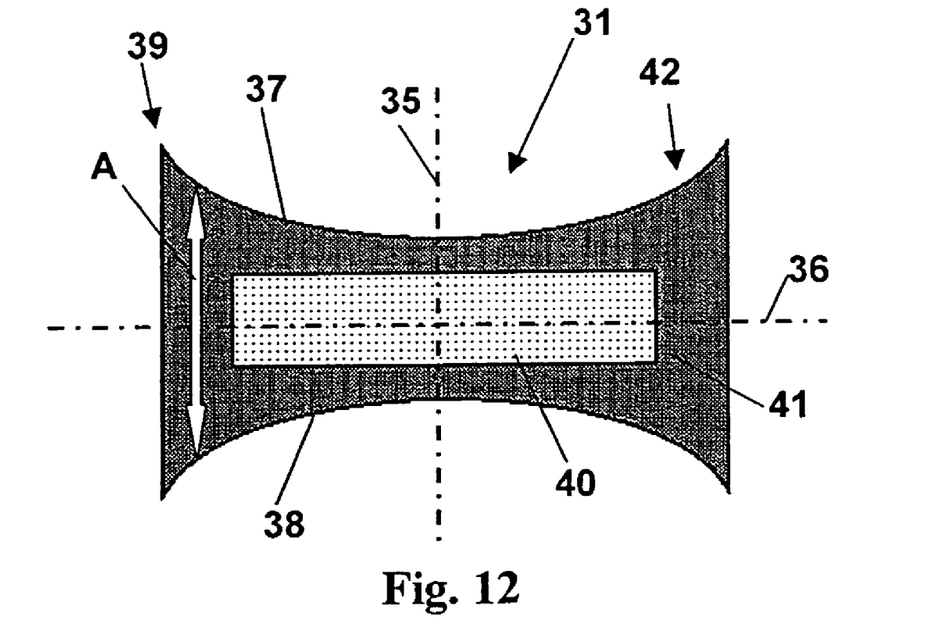

In the blank 31 which is schematically shown in FIG. 12, the formation of such inhomogeneities is minimized during annealing because of the special geometry of the blank. The blank 31 according to the invention is equipped with a concavely inwardly curved upper side 37 and an also concavely inwardly curved lower side 38 (concave annealing form). With such a geometry, the distance "A" between lower side 38 and upper side 37 decreases continuously from the edge 39 towards the center axis 35. The blank 31 has an outer diameter of 300 mm. The distance A between upper side and lower side in the area of the center axis 5 is 80 mm, and it is 165 mm in the area of the outer edge 39. The concave inner curvature, starting at the center line 35, can be described by the following mathematical function:

$$y = 40 + 0.02x^2 \text{ [mm]}$$

The contour 40 of the member has the shape of a round even plate with an outer diameter of 250 mm and a thickness of 40 mm.

Thus, when compared with the blank 32 shown in FIG. 13, the blank 31 is characterized by a thickened portion 42 which decreases from the outer edge 39 to the inside. In particular in the area of the outer edge 39, this constitutes an increase in the overdimension 41, which is also present otherwise.

Thanks to the thickened portion 42, a flatter temperature gradient and a more homogeneous temperature profile than in blank 32 are achieved during the heating and cooling phases. At the same time, a more homogeneous curve of the position of the chemical equilibrium according to equation (1) within the contour 40 of the member is achieved in the blank 31 on account of the thickened portion 42.

Moreover, the thickened portion 42 prevents hydrogen from diffusing out of the peripheral portions 39 of the blank 31, whereby the mean diffusion path length is simultaneously extended on the whole. The concave shape of the surface of blank 31, in particular, accomplishes an adaptation of the diffusion path lengths within the blank 31 and a narrow distribution of the diffusion path lengths so that, despite an outdiffusion of hydrogen during annealing of the blank 31, a flatter gradient of the hydrogen concentration is obtained within the contour 40 of the member.

On the whole, a comparatively constant position of the chemical equilibrium (1) and thus a homogeneous distribution of the fictive temperature are achieved in the blank 31 within the contour 40 of the member.

Figure 14:
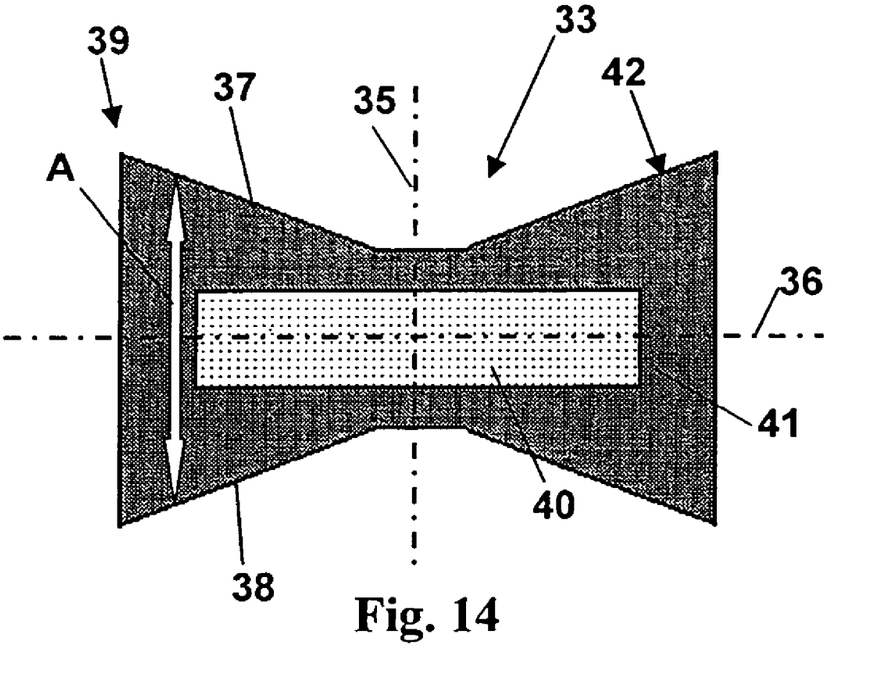
Figure 15:
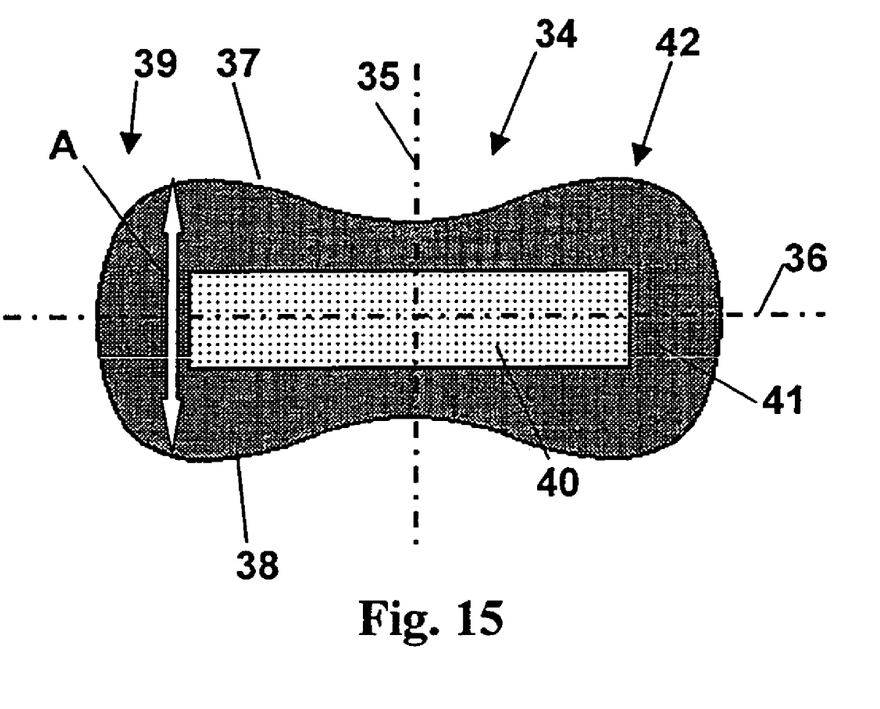

FIGS. 14 and 15 show modifications of the ideal "concave annealing form" illustrated in FIG. 12. In the blank 33 according to FIG. 14, there is provided a thickened portion 42 within which the distance "A" between upper side 37 and lower side 38 decreases linearly from the outer edge 39 to an area around the center axis 35. In the blank 34 according to FIG. 15, there is provided a thickened portion 42 which is dumbbell-shaped in the illustrated cross-section. The effect of the thickened portions 42 illustrated in FIGS. 14 and 15 with respect to the setting of a high homogeneity in the area of the member contour 40 during annealing of blanks 33 and 34 is comparable with the blank 31 shown in FIG. 12.

During annealing (in particular during cooling) using a blank 31,33,34 according to the present invention, one obtains—in the area of the member contour 40—a flat temperature gradient, a flat gradient of the hydrogen concentration, a flat distribution of the position of the above-indicated chemical equilibrium (1), as well as locally similar time curves of the viscosity. This is accompanied by a high degree of homogeneity within the member contour 40.

Pressing, forming and melting processes using suitable forms are particularly suited for producing blanks 31, 33 and 34.

From the results above, the effect of the present invention can be clearly understood.

The methods for measuring the physical properties and the like as described in Examples and Comparative Examples are as follows.

(1) Method for measuring the concentration of hydrogen molecules: A method as described in V. S. Khotimchenko et al., *J. Appl. Spectrosc.*, 46, 632–635 (1987) was employed.

(2) Method for measuring Na impurity concentration: A method using flameless atomic absorption spectroscopy was used.

(3) Method for measuring the initial transmittance for a radiation 193.4 nm in wavelength: A measurement method comprising obtaining an apparent transmittance T % for a sample thickness of 10 mm, and calculating the value in accordance with (T/90.68)×100, by using the value 90.68% obtained by subtracting the loss due to Rayleigh scattering 0.18% from the theoretical transmittance 90.68% of a quartz glass for a radiation 193.4 nm in wavelength.

(4) Method for measuring the fluctuation in refractive index Δn: A measuring method according to optical interference method using a He—Ne laser (emitting radiation at a wavelength of 633 nm) as light source was used. In the measurement above, the values are given for an area 180 mm in diameter.

(5) Method for measuring birefringence: A retardation measuring method using a polarizer strain meter was used.

(6) Method for measuring the particle diameter of the synthetic quartz glass powder: The powder was classified by using JIS standardized sieves having Nylon screens with apertures of 53 μm and 710 μm.

What is claimed is:

1. A method for producing an optical member of quartz glass, said method comprising:

providing a blank which includes a contour portion for the contour of the optical member to be produced and an overdimension portion that has a surface which is defined by a lower side, an upper side opposite said lower side and spaced apart therefrom, and an outer edge extending around a center axis, and subjecting said blank to a thermal treatment; and subsequently cooling the blank, wherein measures are provided which, during cooling, keep heat conduction in an area adjacent said outer edge lower than in an area adjacent said center axis;

removing the overdimension portion so as to expose the optical member; and wherein the measures comprise use of a preform as said blank wherein said overdimension portion includes a thickened portion which extends from said outer edge towards said center axis, said thickened portion varying in thickness so that the distance between the lower side and the upper side in an area adjacent the outer edge is greater than the distance between the lower side and the upper side in an area of said center axis.

2. The method according to claim 1, wherein the distance between lower side and upper side across said thickened portion decreases continuously inwardly towards said center axis.

3. The method according to claim 2, wherein said distance decreases faster than linearly relative to an inward position on the blank.

4. The method according to claim 2, wherein said distance decreases linearly relative to an inward position on the blank.

5. The method according to claim 2, wherein said thickened portion begins at said outer surface.

6. The method according to claim 2, wherein said thickened portion extends from said center axis to said outer surface.

7. The method according to claim 1, wherein said thickened portion begins at said outer surface.

8. The method according to claim 1, wherein said thickened portion extends from said center axis to said outer surface.

9. The method according to claim 1, wherein said thickened portion is adjacent the upper side and a second thickened portion is provided adjacent the lower side, both of the thickened portions being thicker outwardly of the blank than in the area of the center axis thereof.

10. A method for producing an optical member of quartz glass, said method comprising:
providing a blank comprising a contour portion for the contour of the optical member to be produced and an overdimension portion surrounding the contour portion, said overdimension portion having a center axis, a lower portion, an upper portion opposite said lower portion and spaced apart therefrom, and an outer edge extending around the center axis,
subjecting said blank to a thermal treatment;
subsequently cooling the blank; and
removing the overdimension portion so as to expose the optical member;
said overdimension portion being configured such that, during cooling, heat conduction from the contour portion adjacent said outer edge is limited more than adjacent said center axis; and
wherein at least one of the upper and lower portions of the overdimension portion have different thicknesses adjacent the center axis and adjacent the outer edge, the thickness thereof adjacent the center axis being less than the thickness adjacent the outer edge.

11. The method according to claim 10, wherein said one of the upper or lower portions of the overdimension portion continuously decreases in thickness from the thickness adjacent the outer edge to the thickness adjacent the center axis.

12. The method according to claim 11, wherein said thickness decreases in a linear relation to an inward distance of the portion.

13. The method according to claim 11, wherein said thickness decreases at least in part at a greater than linear relation to an inward distance of the portion, so that the portion has an outwardly concave shape.

14. The method according to claim 10, wherein the upper and lower portions of the overdimension portion each have different thicknesses adjacent the center axis and adjacent the outer edge, the thicknesses thereof adjacent the center axis being less than the thicknesses thereof adjacent the outer edge.

15. The method according to claim 14, wherein the upper and lower portions of the overdimension portion each continuously decrease in thickness from the thickness thereof adjacent the outer edge to the thickness thereof adjacent the center axis.

16. The method according to claim 14, wherein said thicknesses decrease in a linear relation to an inward distance of the portion.

17. The method according to claim 14, wherein said thicknesses decrease at least in part at a greater than linear relation to an inward distance of the portion, so that the upper and lower portions each has an outwardly concave shape.

18. A method for producing an optical member of quartz glass, said method comprising:
providing a blank which includes a contour portion for the contour of the optical member to be produced and an overdimension portion that has a surface which is defined by a lower side, an upper side opposite said lower side and spaced apart therefrom, and an outer edge extending around a center axis, and
subjecting said blank to a thermal treatment; and
subsequently cooling the blank, wherein measures are provided which, during cooling, keep heat conduction in an area adjacent said outer edge lower than in an area adjacent said center axis;
removing the overdimension portion so as to expose the optical member; and
wherein the measures comprise
introducing said blank into a vessel having a removable upper side and a lower side opposite said upper side and spaced apart therefrom, and an outer edge connecting upper side and lower side and extending around a center axis, said upper side, said lower side and said outer edge defining an interior of the vessel receiving therein said blank, said upper side and said lower side have a higher thermal conduction in an area of said center axis than in an area adjacent said outer edge,
filling intermediate spaces between said blank and said vessel with $SiO_2$ powder, and
subjecting said blank surrounded by said $SiO_2$ powder in said vessel to a thermal treatment by introducing said vessel into a furnace and heating and subsequently cooling the vessel.

19. The method according to claim 18, wherein the removable upper side and lower side each having a thickness in the area of the center axis that is less than a thickness thereof adjacent the outer edge so as to provide said higher thermal conduction in the area of said center axis.

20. The method according to claim 19, wherein the upper or lower sides decrease in thickness from the thickness adjacent the outer edge to the thickness in the area of the center axis.

21. The method according to claim 20, wherein said thicknesses decrease stepwise from the outer edge.

22. The method according to claim 20, wherein said thicknesses decrease linearly from the outer edge.

23. The method according to claim 18, wherein said removable upper side and lower side each have slits therein in the area of the center axis that increase heat conduction therein.

* * * * *